(12) United States Patent
Couto et al.

(10) Patent No.: US 8,800,087 B2
(45) Date of Patent: Aug. 12, 2014

(54) RAMP SYSTEM

(71) Applicants: Wally Couto, Burlington (CA); John Goddard, Burlington (CA)

(72) Inventors: Wally Couto, Burlington (CA); John Goddard, Burlington (CA)

(73) Assignee: MMC Bus Division Inc. (CA)

( * ) Notice: Subject to any disclaimer, the term of this patent is extended or adjusted under 35 U.S.C. 154(b) by 0 days.

(21) Appl. No.: 14/025,785

(22) Filed: Sep. 12, 2013

(65) Prior Publication Data

US 2014/0044512 A1 Feb. 13, 2014

Related U.S. Application Data

(63) Continuation of application No. 13/419,421, filed on Mar. 12, 2012, now Pat. No. 8,555,443.

(60) Provisional application No. 61/452,606, filed on Mar. 14, 2011.

(51) Int. Cl.
*B60P 1/43* (2006.01)
*A61G 3/06* (2006.01)

(52) U.S. Cl.
CPC . *B60P 1/43* (2013.01); *B60P 1/431* (2013.01); *A61G 3/061* (2013.01)
USPC ............................................ 14/71.1; 14/69.5

(58) Field of Classification Search
CPC .............................. B65G 69/2829; A61G 3/00
USPC ................................................. 14/69.5, 71.1
See application file for complete search history.

(56) References Cited

U.S. PATENT DOCUMENTS

| 4,601,632 | A  | 7/1986  | Agee |
| 5,273,335 | A  | 12/1993 | Belnap et al. |
| 5,277,436 | A  | 1/1994  | Frank et al. |
| 6,345,950 | B1 | 2/2002  | Gerwitz |
| 6,431,815 | B1 | 8/2002  | Zarzecki et al. |
| 6,722,721 | B2 | 4/2004  | Sherrer et al. |
| 7,451,512 | B2 | 11/2008 | Fullerton et al. |
| 7,802,337 | B2 | 9/2010  | van Roosmalen et al. |
| 8,285,290 | B2 | 10/2012 | Arora et al. |
| 2007/0261181 | A1 | 11/2007 | Willard et al. |
| 2008/0187425 | A1 | 8/2008  | Morris |
| 2008/0263790 | A1 | 10/2008 | Hoffman |
| 2012/0233787 | A1 | 9/2012  | Couto et al. |

FOREIGN PATENT DOCUMENTS

DE EP 931532 * 1/1998 ............... A61G 3/06

* cited by examiner

*Primary Examiner* — Raymond W Addie
(74) *Attorney, Agent, or Firm* — Steven M. Greenberg; CRGO Law

(57) ABSTRACT

A vehicle ramp system has multiple configurations. The simplest embodiment provides a ramp which can move between a retracted configuration and an extended "step in" configuration in which an outboard end of the ramp is closer to the ground than in the retracted configuration, so that the outboard end of the ramp functions as a lowered step. A preferred embodiment provides a fully retracted configuration, a partially extended "step in" configuration, a partially extended "curb ramp" configuration in which the outboard end of the ramp can engage a curb or sidewalk, and a fully extended configuration in which the outboard end of the ramp can engage a road surface of the road on which the vehicle carrying the ramp is supported.

11 Claims, 13 Drawing Sheets

RAMP SYSTEM

CROSS-REFERENCE TO RELATED APPLICATIONS

This application is a Continuation of U.S. application Ser. No. 13/419,421, filed Mar. 13, 2012, entitled "RAMP SYSTEM," which claims priority to Provisional U.S. Application No. 61/452,606, filed Mar. 14, 2011, the entirety of which is incorporated herein by reference.

TECHNICAL FIELD

The present disclosure relates to ramp systems, and more particularly to vehicle ramp systems, with particular application to ramp systems for assisting elderly and disabled persons in boarding a vehicle.

BACKGROUND

It is known to provide ramp systems for vehicles such as buses in order to assist elderly and disabled passengers in entering and exiting such vehicles. In many cases, the ramp systems include a portion that can be extended out of the vehicle during boarding and deboarding, and then retracted into the vehicle so that the ramp does not interfere with the vehicle as it travels.

Numerous vehicle ramp systems are known in the art. One example of a vehicle ramp system is shown and described in U.S. Patent Application Publication No. 2008/0187425 in the name of Morris et al.

An important challenge in designing vehicle ramp systems is to accommodate a wide variety of circumstances, such as passengers in wheelchairs and scooters, passengers using walkers, and passengers having limited mobility but who can walk without assistive devices, any of whom may be boarding from curbed sidewalks of varying heights, and at various distances from the side of the vehicle, or boarding from the same road surface on which the vehicle rests. Such design challenges are compounded by the need to be able to retract the ramp system into a sufficiently compact space to meet the constraints of the vehicle to which the ramp system will be mounted, such as chassis space, floor space, and the like.

SUMMARY

The present disclosure describes vehicle ramp systems having multiple configurations. The simplest embodiment provides a ramp which can move between a retracted configuration and an extended "step in" configuration in which an outboard end of the ramp is closer to the ground than in the retracted configuration, so that the outboard end of the ramp functions as a lowered step. A preferred embodiment provides a fully retracted configuration, a partially extended "step in" configuration, a partially extended "curb ramp" configuration in which the outboard end of the ramp can engage a curb or sidewalk, and a fully extended configuration in which the outboard end of the ramp can engage a road surface of the road on which the vehicle carrying the ramp is supported.

In one embodiment, a ramp system comprises a main frame for mounting to a vehicle and a ramp assembly carried by the main frame. The main frame has an inboard end and an outboard end relative to the inboard end. The ramp assembly comprises an inboard ramp section and an outboard ramp section. The inboard ramp section has an inboard end and an outboard end and has an inboard travel surface, and the outboard ramp section has an inboard end and an outboard end and has an outboard travel surface. The inboard ramp section is carried by the main frame with the inboard end of the inboard ramp section adjacent the inboard end of the main frame, and the outboard ramp section is slidably carried by the main frame to be slidably movable between an outboardly extended position and an inboardly retracted position, relative to the main frame. The inboard travel surface and the outboard travel surface cooperate to form a ramp surface for travel between the inboard end of the inboard ramp section and the outboard end of the outboard ramp section.

In some embodiments, the inboard travel surface is inclined and generally descends from the inboard end of the frame toward the outboard end of the frame, and the outboard travel surface is also inclined and generally descends from the inboard end of the outboard ramp section to the outboard end of the outboard ramp section. In such embodiments, the outboard ramp section is preferably slidably movable between the outboardly extended position and the inboardly retracted position along an inclined path of constant slope.

Preferably, the ramp assembly further comprises an outboard extension ramp section movably carried by the main frame to move slidably with the outboard ramp section and to move between a deployed position and a stowed position. In the deployed position the outboard extension ramp section extends generally outboardly from adjacent the outboard end of the outboard ramp section to present a ramp extension travel surface for travel between the outboard end of the outboard ramp section and the outboard end of the outboard extension ramp section, and in the stowed position the outboard extension ramp section extends generally inboardly from adjacent the outboard end of the outboard ramp section in overlapping relation with the outboard ramp section.

Preferably, the ramp assembly is selectively configurable in at least a fully retracted configuration, a partially extended "step in" configuration, a partially extended "curb ramp" configuration and a fully extended configuration In the fully retracted configuration, the outboard ramp section is in the inboardly retracted position and the outboard extension ramp section is in the stowed position, and the fully retracted configuration permits travel between the outermost end of the outboard extension ramp section and the inboard end of the inboard ramp section. In the first partially extended configuration, the outboard ramp section is in the outboardly extended position and the outboard extension ramp section is in the stowed position, and the first partially extended configuration permits travel between the outermost end of the outboard extension ramp section and the inboard end of the inboard ramp section. In the second partially extended configuration, the outboard ramp section is in the inboardly retracted position and the outboard extension ramp section is in the deployed position, and the second partially extended configuration permits travel between the outermost end of the outboard extension ramp section and the inboard end of the inboard ramp section. In the fully extended position, the outboard ramp section is in the outboardly extended position and the outboard extension ramp section is in the deployed position, and the fully extended configuration permits travel between the outermost end of the outboard extension ramp section and the inboard end of the inboard ramp section.

In some embodiments, the outboard extension ramp section has a pivot end and a free end and is pivotally carried at its pivot end by the main frame to move slidably with the outboard ramp section and to pivot between the deployed position and the stowed position. In such embodiments, in the deployed position the outboard extension ramp section defines a first inclined travel path sloping generally upwardly from the free end to the pivot end and in the stowed position the outboard extension ramp section overlaps the outboard ramp section and defines a second inclined travel path sloping generally upwardly from the pivot end to the free end. When the outboard extension ramp section is in the deployed position, the first inclined travel path cooperates with the inboard travel surface and the outboard travel surface for travel between the inboard end of the inboard ramp section and the outboard end of the outboard extension ramp section. In certain particular embodiments, the outboard extension ramp section has first and second opposed outboard extension travel surfaces, and the deployed position exposes the first outboard extension travel surface as the ramp extension travel surface that provides the first inclined travel path while the stowed position exposes the second outboard extension travel surface as the second inclined travel path for travel from the outboard end of the outboard extension ramp section to the inboard end of the outboard extension ramp section.

In certain embodiments, the outboard ramp section has a first depression in the outboard travel surface disposed intermediately between the inboard end of the outboard ramp section and the outboard end of the outboard ramp section, and a second depression in the outboard travel surface adjacent the inboard end of the outboard ramp section. The first depression is closer to the outboard end of the outboard ramp section than the second depression. When the outboard ramp section is in the inboardly retracted position, the outboard end of the inboard ramp section rests within the first depression, and when the outboard ramp section is in the outboardly extended position, the outboard end of the inboard ramp section rests within the second depression. In certain embodiments, the inboard ramp section is pivotally carried by the main frame at the inboard end of the main frame by way of pivotal mounting of the inboard end of the inboard ramp section at the inboard end of the main frame, and the outboard end of the inboard ramp section rests slidably upon the outboard ramp section. The inboard ramp section is preferably longitudinally fixed relative to the main frame Preferably, the outboard ramp section may be maintained in a plurality of intermediate positions between the outboardly extended position and the retracted position.

BRIEF DESCRIPTION OF THE DRAWINGS

These and other features will become more apparent from the following description in which reference is made to the appended drawings wherein.

DETAILED DESCRIPTION

Figure 1:
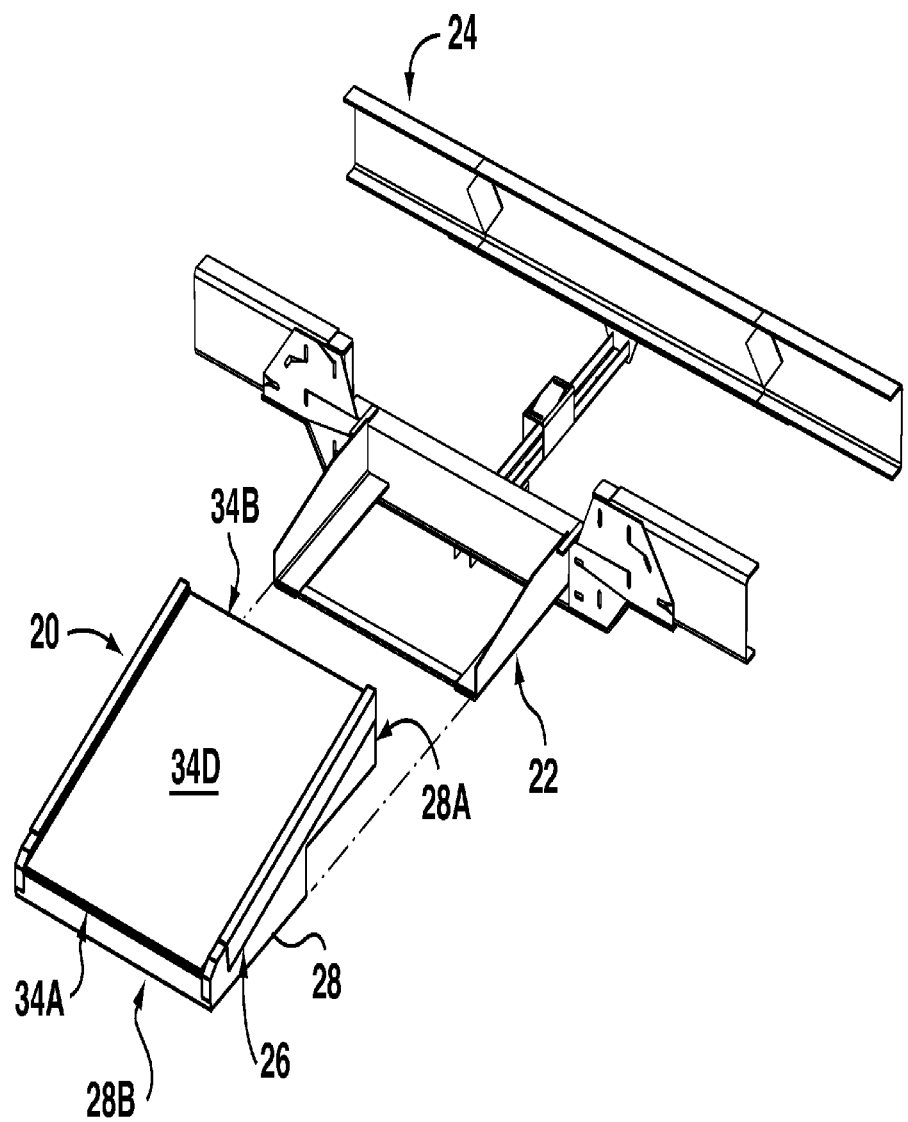
FIG. 1 is a perspective view showing mounting of an exemplary ramp system to an exemplary vehicle frame.

Reference is now made to FIG. 1, which shows an exemplary ramp system 20. The ramp system 20 is designed for mounting to a vehicle, and in the illustrated embodiment shown in FIG. 1 is received in and secured to a housing 22 carried by a vehicle frame 24. The ramp system 20 comprises a ramp assembly 26 for supporting a user to facilitate ingress and egress from a vehicle and a main frame 28 for mounting to a vehicle, for example by way of the housing 22 carried by the vehicle frame 24. The main frame 28 carries the ramp assembly 26. The main frame 28 has an inboard end 28A and an outboard end 28B relative to the inboard end 28A. The ramp system 20 may, for example, be mounted to a vehicle of the type described in U.S. Patent Application Publication No. 2011/0035104 in the name of Judson Smith, the teachings of which are hereby incorporated by reference, and the ramp system 20 may be sized and shaped accordingly. It is also to be appreciated that the specifications of the ramp system 20, including rise over run ratios and other specifications, should be selected to comply with the Americans With Disabilities Act and/or any other relevant legislation and/or regulations in the jurisdiction in which the ramp system 20 is to be used.

Figure 3:
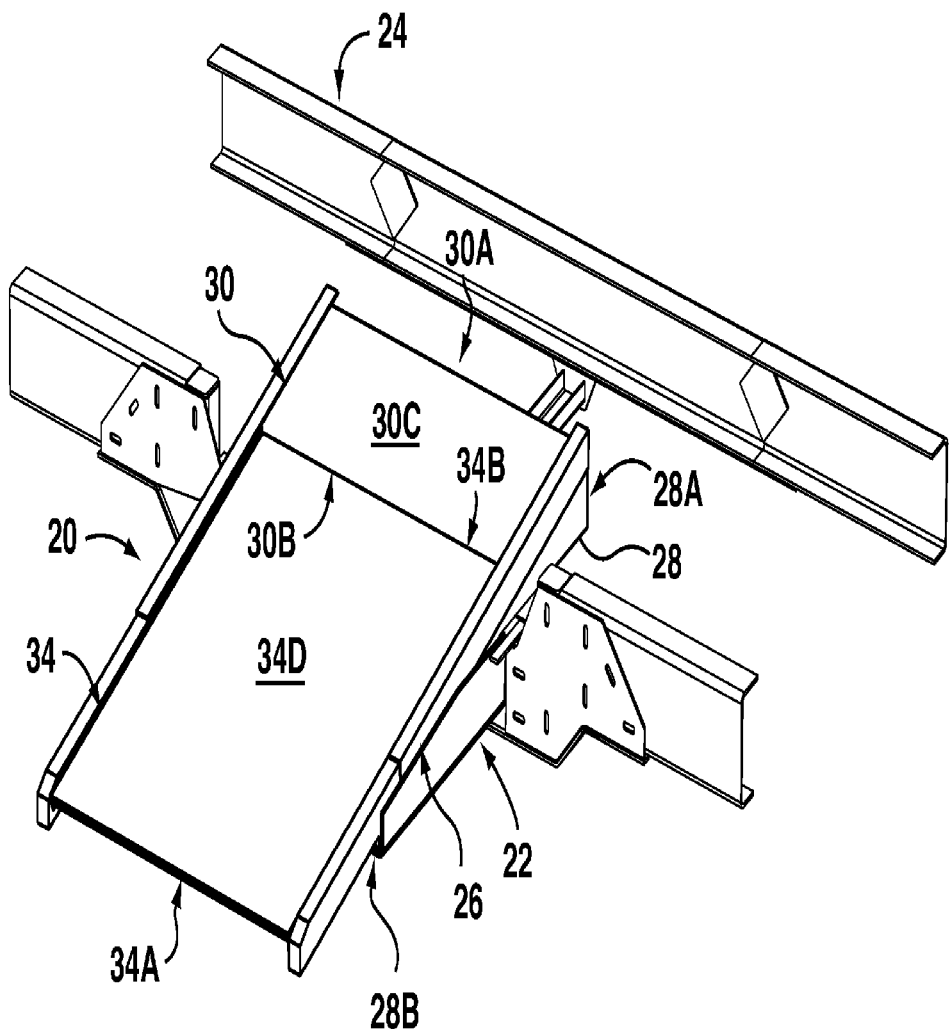
FIG. 3 is a perspective view showing the ramp system of FIG. 1 in a first partially extended or "step in" configuration.
Figure 4:
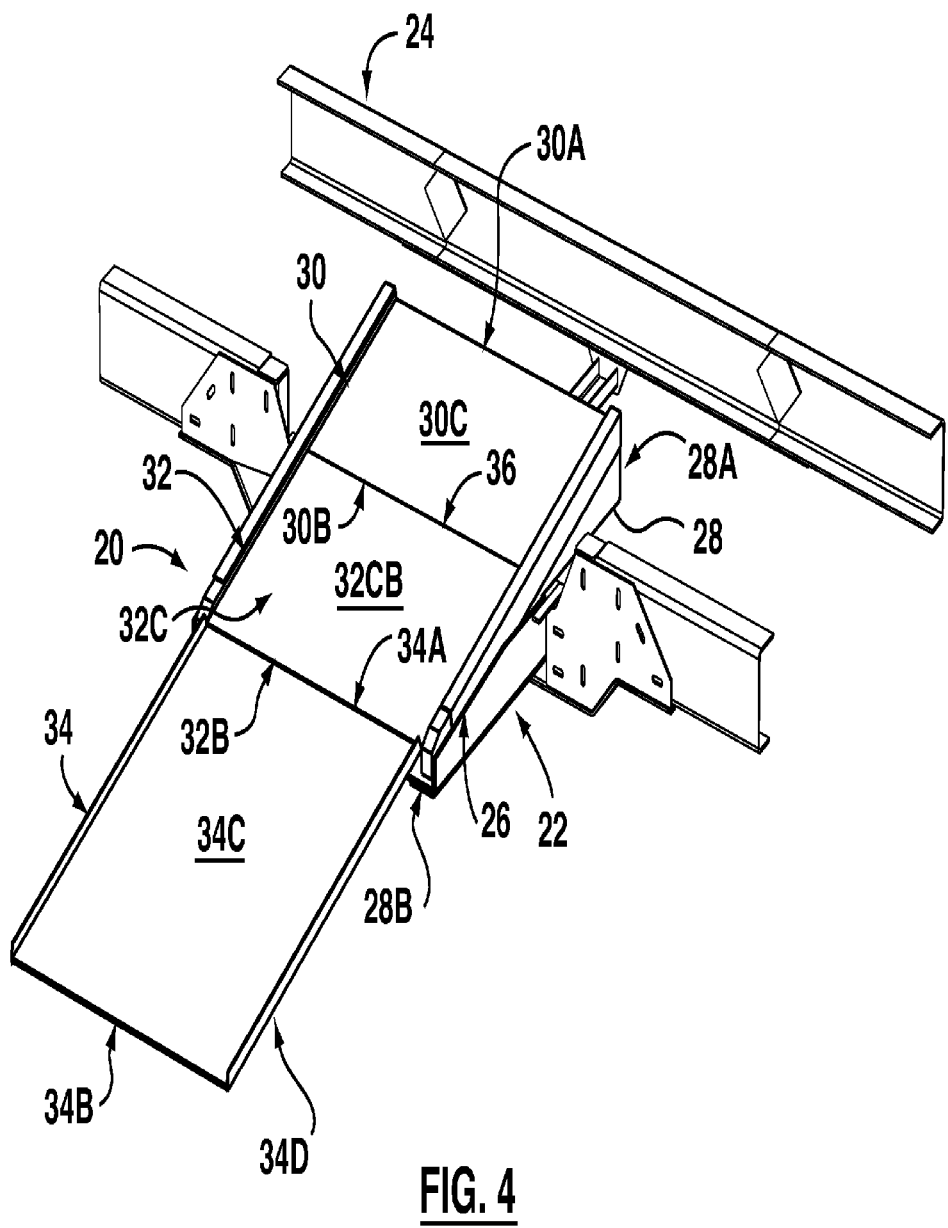
FIG. 4 is a perspective view showing the ramp system of FIG. 1 in a second partially extended or "curb ramp" configuration.
Figure 5:
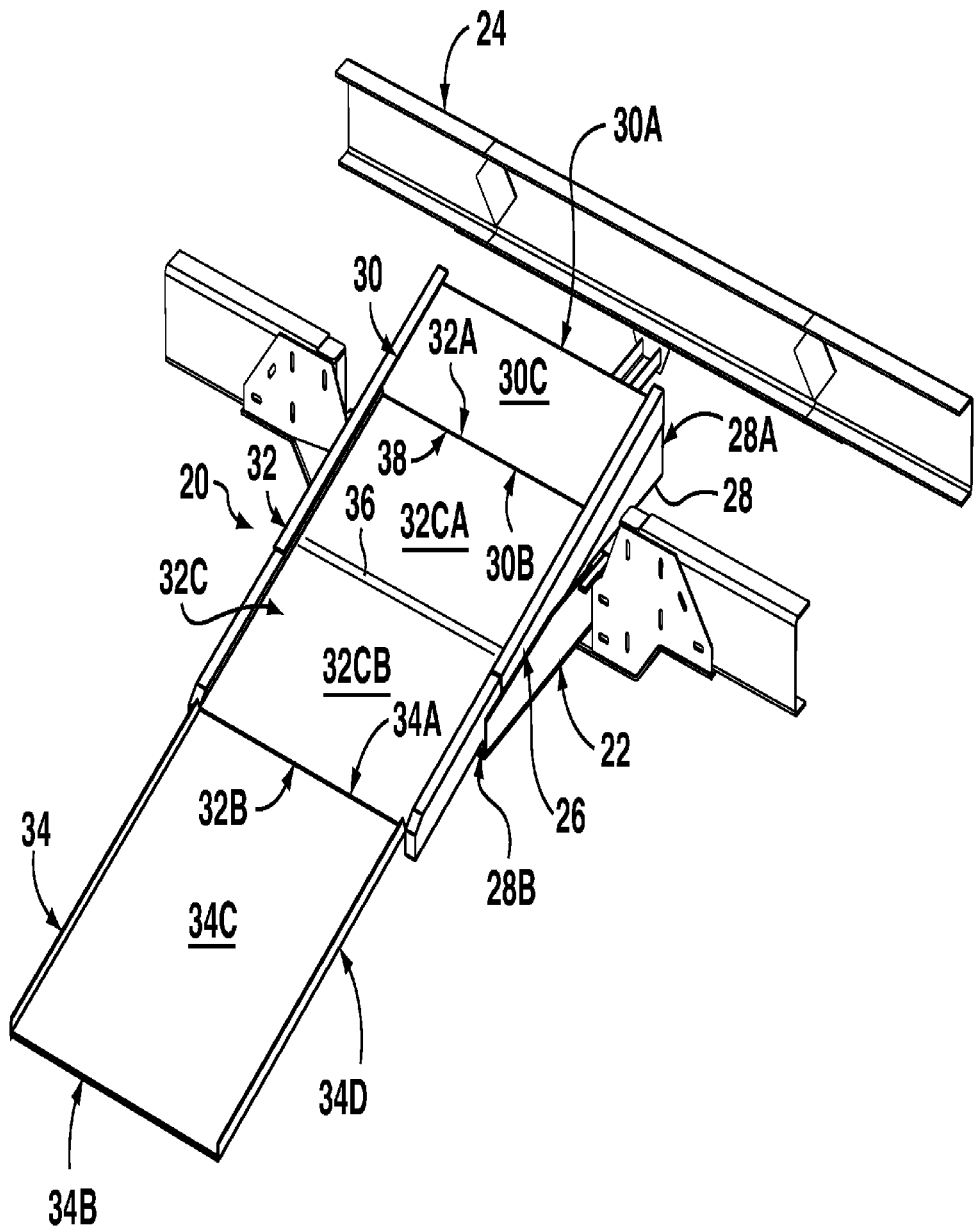
FIG. 5 is a perspective view showing the ramp system of FIG. 1 in a fully extended configuration.
Figure 8:
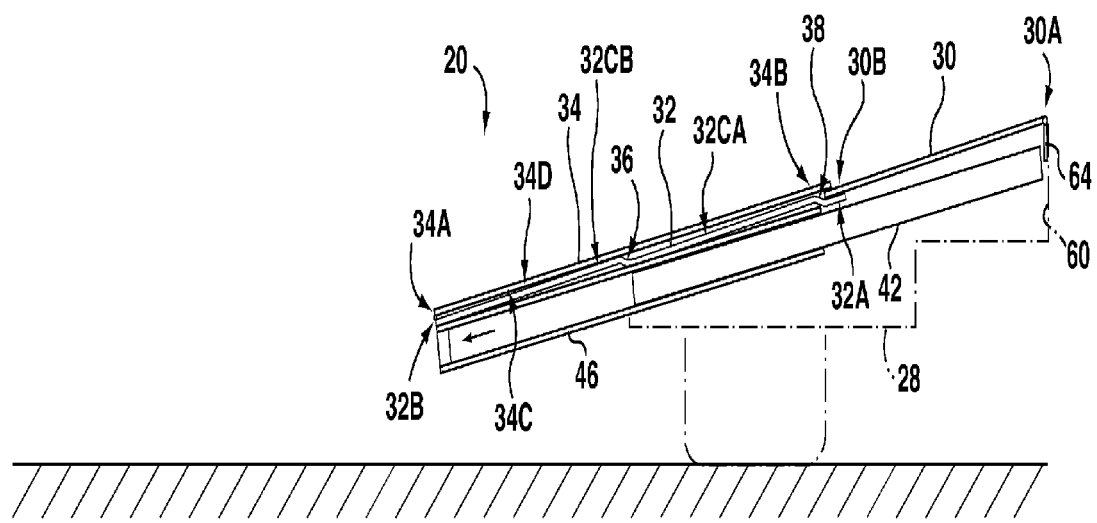
FIG. 8 is a side schematic view showing the ramp system of FIG. 1 in the first partially extended or "step in" configuration.
Figure 9:
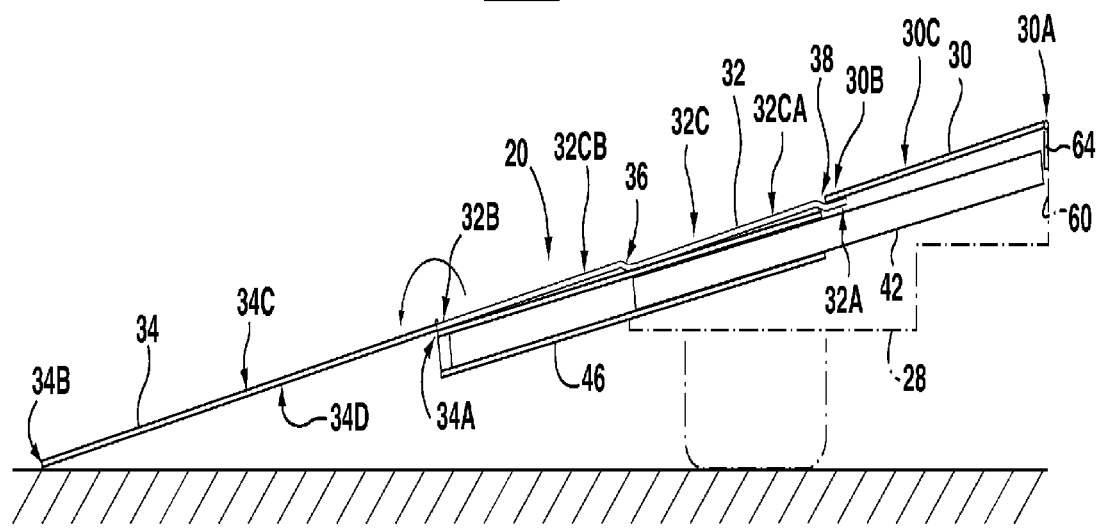
FIG. 9 is a side schematic view showing the ramp system of FIG. 1 in a fully extended configuration.

As best seen in FIGS. 4 and 5 and also in FIG. 9, the ramp assembly 28 comprises an inboard ramp section 30, an outboard ramp section 32 and an outboard extension ramp section 34, each of which is constructed from a material of suitable strength and rigidity. The inboard ramp section 30 has an inboard end 30A and an outboard end 30B and has an inclined inboard travel surface 30C which, when the ramp system 20 is installed on an upright vehicle, slopes generally downwardly. Thus, the inboard travel surface 30C generally descends from the inboard end 30A to the outboard end 30B of the inboard ramp section 30 and therefore generally descends from the inboard end 28A of the frame 28 toward the outboard end 28B of the frame 28. Similarly, the outboard ramp section 32 has an inboard end 32A and an outboard end 32B and has an inclined outboard travel surface 32C which generally descends from the inboard end 32A to the outboard end 32B of the outboard ramp section 32. The outboard ramp section 32 is slidably carried by the main frame 28 so that it can move slidably between an outboardly extended position (FIGS. 3, 5, 8 and 9) and an inboardly retracted position (FIGS. 1, 2, 4, 7 and 10), relative to the main frame 28. The outboard ramp section 32 is preferably slidably movable between the outboardly extended position and the inboardly retracted position along an inclined path of constant slope, which is preferably parallel to the general slope of the outboard travel surface 32C. As will be illustrated in more detail below, the inboard travel surface 30C and the outboard travel surface 32C cooperate to form a ramp surface for travel between the inboard end 30A of the inboard ramp section 30 and the outboard end 32B of the outboard ramp section 32.

The inboard ramp section 30 is carried by the main frame 28 at an upper portion of the inboard end 28A of the main frame 28, with the inboard end 30A of the inboard ramp section 30 disposed adjacent the inboard end 28A of the frame 28. In the illustrated embodiment, the inboard ramp section 30 is pivotally carried by the main frame 28 by way of pivotal mounting of the inboard end 30A of the inboard ramp section 30 to the inboard end 28A of the main frame 28, so that the outboard end 30B of the inboard ramp section 30 rests slidably upon the outboard ramp section 32. Although the inboard ramp section 30 can pivot relative to the main frame 28, it is longitudinally fixed relative to the main frame 28. In alternative embodiments, the inboard end 30A of the inboard ramp section 30 may be fixedly mounted, rather than pivotally mounted, at the inboard end 28A of the main frame 28 and may be provided with a slight downward flex so as to rest slidably upon the outboard ramp section 32.

Continuing to refer particularly to FIGS. 4, 5 and 9, the outboard extension ramp section 34 is movably carried by the main frame 28 to move slidably with the outboard ramp section 32 and so as to be movable between a deployed position and a stowed position. In the deployed position, the outboard extension ramp section 34 extends generally outboardly from adjacent the outboard end 32B of the outboard ramp section 32 to present a ramp extension travel surface for travel between the outboard end of the outboard ramp section and the outboard end of the outboard extension ramp section. In the stowed position, the outboard extension ramp section 34 extends generally inboardly from adjacent the outboard end 32B of the outboard ramp section 32 in overlapping relation with the outboard ramp section 32.

In the exemplary illustrated embodiment, the outboard extension ramp section 34 has a pivot end 34A and a free end 34B and is pivotally carried at its pivot end 34A by the main frame 28 to pivot between the deployed position and the stowed position. In the deployed position, the outboard extension ramp section 34 defines a first inclined travel path sloping generally upwardly from the free end 34B to the pivot end 34A (FIGS. 4, 5, 9 and 10) and in the stowed position the outboard extension ramp section 34 overlaps and is generally parallel to the outboard travel surface 32C and defines a second inclined travel path sloping generally upwardly from the pivot end 34A to the free end 34B (FIGS. 1, 2, 3, 7 and 8). In the exemplary embodiment shown in FIGS. 1 to 5 and 7 to 10, the outboard extension ramp section 32 has first and second opposed outboard extension travel surfaces 34C and 34D, respectively, and in the deployed position the outboard extension ramp section 32 exposes the first outboard extension travel surface 34C as the ramp extension travel surface that provides the first inclined travel path while in the stowed position the outboard extension ramp section 32 exposes the second outboard extension travel surface 34D as the second inclined travel path for travel between the outboard end 32B of the outboard ramp section 32 to the inboard end 32A of the outboard ramp section 32. When the outboard extension ramp section is 34 in the deployed position, the first inclined travel path cooperates with the inboard travel surface 30C and the outboard travel surface 32C for travel between the inboard end 30A of the inboard ramp section 30 and the free end 34B of the outboard extension ramp section 34.

The ability of the outboard ramp section 32 to reciprocate between the outboardly extended and inboardly refracted position, and the ability of the outboard extension ramp section 34 to reciprocate between the deployed position and the stowed position, combine to enable the ramp system 20 to be used in variety of configurations, depending on the circumstances.

Figure 2:
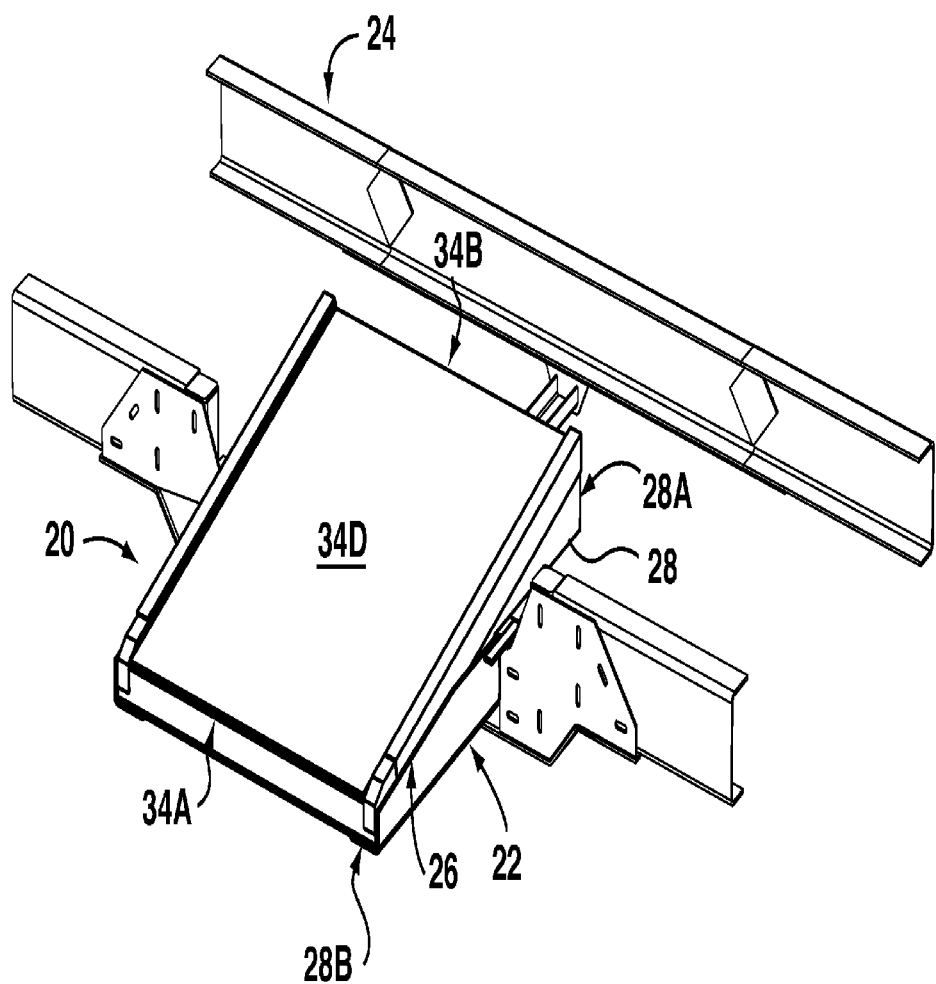
FIG. 2 is a perspective view showing the ramp system of FIG. 1 in a fully retracted configuration.
Figure 7:
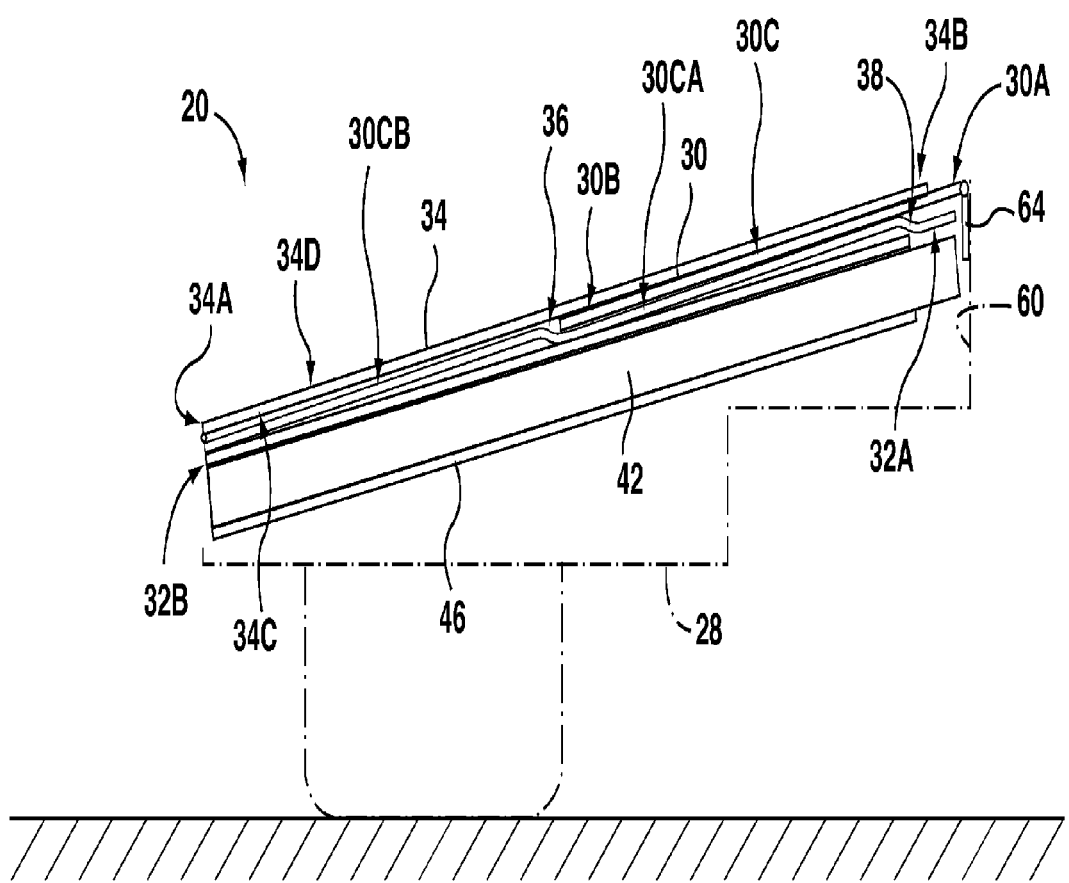
FIG. 7 is a side schematic view showing the ramp system of FIG. 1 in a fully retracted configuration.

As shown in FIGS. 2 and 7, in a fully retracted configuration of the ramp system 20 the outboard ramp section 32 is in the inboardly retracted position and the outboard extension ramp section 34 is in the stowed position, so that the generally inboardly extending outboard extension ramp section 34 is substantially parallel to both the inboard ramp section 30 and the outboard ramp section 32 and substantially completely overlaps both the outboard travel surface 32C and the inboard travel surface 30C, so that only the second outboard extension travel surface 34D is exposed. In this fully retracted configuration, the ramp system 20 permits travel between the pivot end 34A of the outboard extension ramp section 34 and the inboard end 30A of the inboard ramp section 30, and can serve as a simple step into and out of a vehicle. This configuration would typically be used when a person boarding the vehicle is not disabled.

As shown in FIGS. 3 and 8, in a first partially extended or "step in" configuration of the ramp system 20, the outboard ramp section 32 is in the outboardly extended position and the outboard extension ramp section 34 is in the stowed position. This first partially extended configuration also permits travel between the pivot end 34A of the outboard extension ramp section 34 and the inboard end 30A of the inboard ramp section 30. Because the outboard ramp section 32 is in the outboardly extended position, although the generally inboardly extending outboard extension ramp section 34 is substantially parallel to both the inboard ramp section 30 and the outboard ramp section 32, it substantially completely overlaps only the outboard travel surface 32C, while leaving substantially all of the inboard travel surface 30C exposed, along with the second outboard extension travel surface 34D. Moreover, because the outboard ramp section 32 moves slidably along an inclined path of constant slope that descends from the inboard end 28A toward the outboard end 28 of the main frame 28, movement of the outboard ramp section 32 from the inboardly retracted position to the outboardly extended position has the effect of lowering the outboard end 32B of the outboard ramp section 32 and the pivot end 34A of the outboard extension ramp member 34, relative to the vehicle on which the ramp system 20 is installed and relative to the surface on which the vehicle rests. This is referred to as a "step in" configuration because the lowered outboard end 32B of the outboard ramp section 32 (and the lowered pivot end 34A of the outboard extension ramp member 34) serves as a step into the vehicle. The first partially extended or "step in" configuration can be used, for example, to assist an elderly person who walks with the aid of a walker or a person with limited mobility. In a typical embodiment, the height of the outboard end 32B of the outboard ramp section 32 and the pivot end 34A of the outboard extension ramp member 34 may be lowered from about 11 inches above the ground on which the vehicle rests to about 7 inches about the ground.

Figure 10:
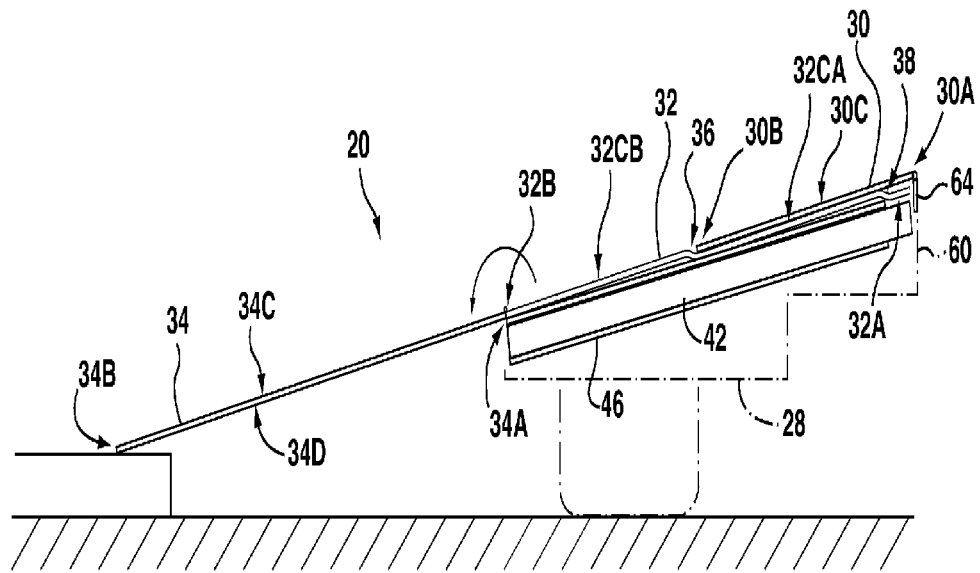
FIG. 10 is a side schematic view showing the ramp system of FIG. 1 in a second partially extended or "curb ramp" configuration.

FIGS. 4 and 10 show the ramp system 20 in a second partially extended or "curb ramp" configuration in which the outboard ramp section 32 is in the inboardly retracted position and the outboard extension ramp section 34 is in the deployed position in which the outboard extension ramp section 34 extends generally outboardly from adjacent the outboard end 32B of the outboard ramp section 32. The second partially extended configuration permits travel between the free end 34B of the outboard extension ramp section 34 and the inboard end 30A of the inboard ramp section 30. In this configuration, the outboard travel surface 32C is partially exposed, that is, an outboard portion 32CB of the outboard travel surface 32C is exposed while an inboard portion 32CA of the outboard travel surface 32C is covered by the inboard ramp section 30, and the inboard travel surface 30C and the first outboard extension travel surface 34C are substantially completely exposed. The second outboard extension travel surface 34D faces the surface on which the vehicle rests. The inboard ramp section 30, outboard ramp section 32 and outboard extension ramp section 34 are all substantially parallel to one another, as in the fully retracted and first partially extended configurations. The second partially extended configuration is referred to as a "curb ramp" configuration because, with the outboard ramp section 32 in the inboardly retracted position, the free end 34B of the outboard extension ramp section 34 will be positioned several inches above the surface on which the vehicle rests, and is suitably positioned to rest on a curb defined by a raised sidewalk, as shown in FIG. 10. Accordingly, the second partially extended or "curb ramp" configuration of the ramp system 20 may be used, for example to enable a wheelchair user or scooter user to enter a vehicle directly from, and exit a vehicle directly to, a raised sidewalk.

Reference is now made to FIGS. 5 and 9, which show the ramp system 20 in a fully extended configuration. In the fully extended configuration of the ramp system 20, the outboard ramp section 32 is in the outboardly extended position and the outboard extension ramp section 34 is in the deployed position in which the outboard extension ramp section 34 extends generally outboardly from adjacent the outboard end 32B of the outboard ramp section 32. The fully extended configuration also permits travel between the free end 34B of the outboard extension ramp section 34 and the inboard end 30A of the inboard ramp section 30, although over a longer travel path than the second partially extended configuration. The inboard travel surface 30C, the outboard travel surface 32C and the first outboard extension travel surface 34C are all substantially completely exposed, although the inboard end 32A of the outboard ramp section 30 is covered by the outboard end 30B of the inboard ramp section 30. As in the second partially extended or "curb ramp" configuration, in the fully extended configuration the second outboard extension travel surface 34D faces the surface on which the vehicle rests. In the fully extended configuration, the inboard travel surface 30, outboard ramp section 32 and outboard extension ramp section 34 are all substantially parallel to one another, as in the fully retracted, first partially extended and second partially extended configurations. Correspondingly, the inboard travel surface 30C, outboard travel surface 32C comprising the outboard portion 32CB and the inboard portion 32CA, and the first outboard extension travel surface 34C are all substantially parallel to one another. In the fully extended configuration, the free end 34B of the outboard extension ramp section 34 will generally be positioned in engagement, or very slightly above, the surface on which the vehicle rests, enabling a wheelchair user or scooter user to enter a vehicle directly from, and exit the vehicle directly to, a roadway or other surface on which the vehicle rests.

Figure 14:
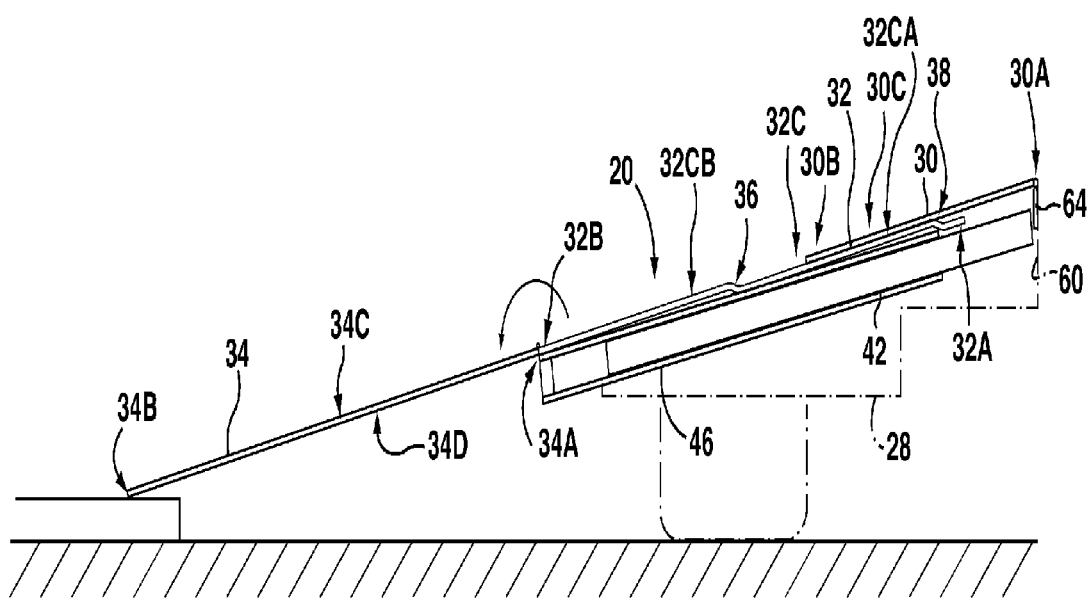
FIG. 14 is a side schematic view showing the ramp system of FIG. 1 with its outboard ramp section in a first intermediate position and its outboard extension ramp member in a deployed position.
Figure 15:
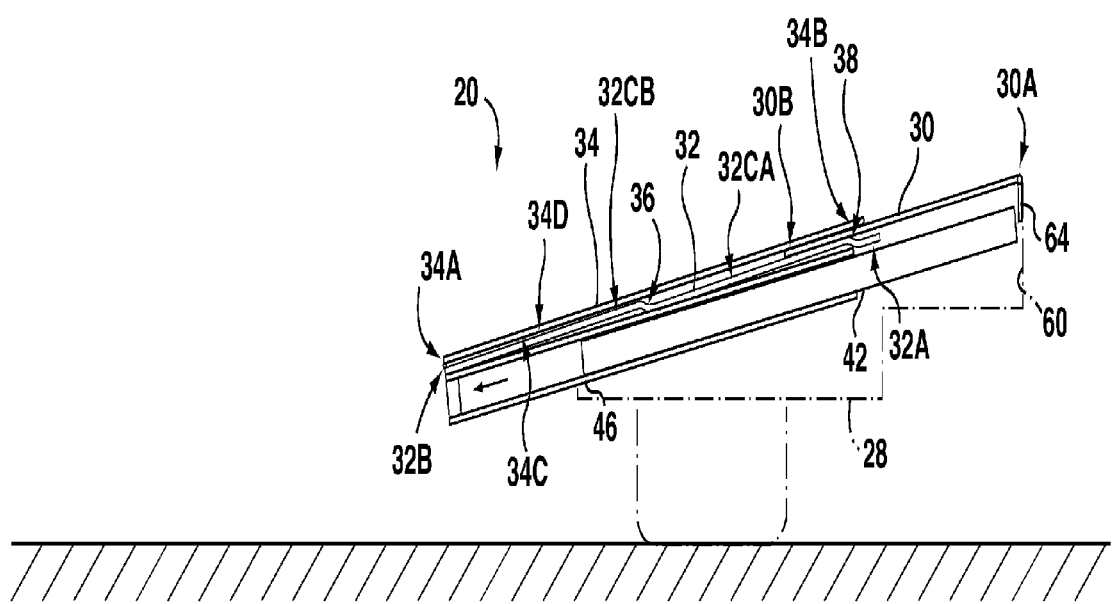
FIG. 15 is a side schematic view showing the ramp system of FIG. 1 with its outboard ramp section in a second intermediate position and its outboard extension ramp member in a stowed position.

The outboard ramp section 32 can also be maintained in intermediate positions between the outboardly extended position and the inboardly retracted position, so as to provide further versatility. Thus, with the outboard extension ramp section 34 in the deployed position, the ramp system 20 can accommodate curbs of various heights by varying the distance that the outboard ramp section 32 is extended, relative to the inboardly retracted position, as shown in FIG. 14. Similarly, with the outboard extension ramp section 34 in the stowed position, by varying the distance that the outboard ramp section 32 is extended as shown in FIG. 15, relative to the inboardly retracted position, the ramp system 20 can provide a step of varying height.

As shown in FIGS. 7 to 10, and as best seen in FIG. 9, the outboard travel surface 32C of the outboard ramp section 32 defines a first transition 36 disposed intermediately between the inboard end 32A of the outboard ramp section 32 and the outboard end 32B of the outboard ramp section 32 and a second transition 38 in the outboard travel surface 32C adjacent the inboard end 32A of the outboard ramp section 32. The first transition 36 extends across the width of the outboard ramp section 32, and divides the outboard travel surface 32C into an inboard portion 32CA and an outboard portion 32CB which are parallel to one another, with the inboard portion 32CA stepped downwardly, relative to the outboard portion 32CB, by an amount approximately equal to the thickness of the inboard ramp section 30, to form a first depression, relative to the outboard portion 32CB. Similarly, the second transition 38 also extends across the width of the outboard ramp section 32, such that the inboard end 32A of the outboard ramp section 32 is stepped downwardly, relative to the inboard portion 32CA, by an amount approximately equal to the thickness of the inboard ramp section 30, to form a second depression, relative to the inboard portion 32CA. As can be seen in the Figures, the first depression is closer to the outboard end 32B of the outboard ramp section 32 than the second depression. The transitions 36, 38 between the outboard portion 32CB and the inboard portion 32CA of the outboard ramp section 32, and between the inboard portion 32CA and the inboard end 32A of the outboard ramp section 32, are curved or sloped gradually to enable the outboard end 30B of the inboard ramp section to slide over the transitions 36, 38 as the outboard ramp section 32 moves between the outboardly extended position and the inboardly retracted position. As shown in FIGS. 8 and 9, when the outboard ramp section 32 is in the outboardly extended position, the outboard end 30B of the inboard ramp section 30 rests slidably within the second depression defined by the downwardly stepped inboard end 32A of the outboard ramp section 32, and when the outboard ramp section 32 is in the inboardly retracted position, as shown in FIGS. 7 and 10, the outboard end 30B of the inboard ramp section 30 rests slidably within the first depression defined by the downwardly stepped inboard portion 32CA of the outboard ramp section 32. As noted above, the inboard ramp section may be either pivotally or fixedly mounted to the main frame. Although the transitions 36, 38 may slope upward, the overall outboard travel surface 32C nonetheless slopes generally downwardly in terms of its overall slope.

Figure 12:
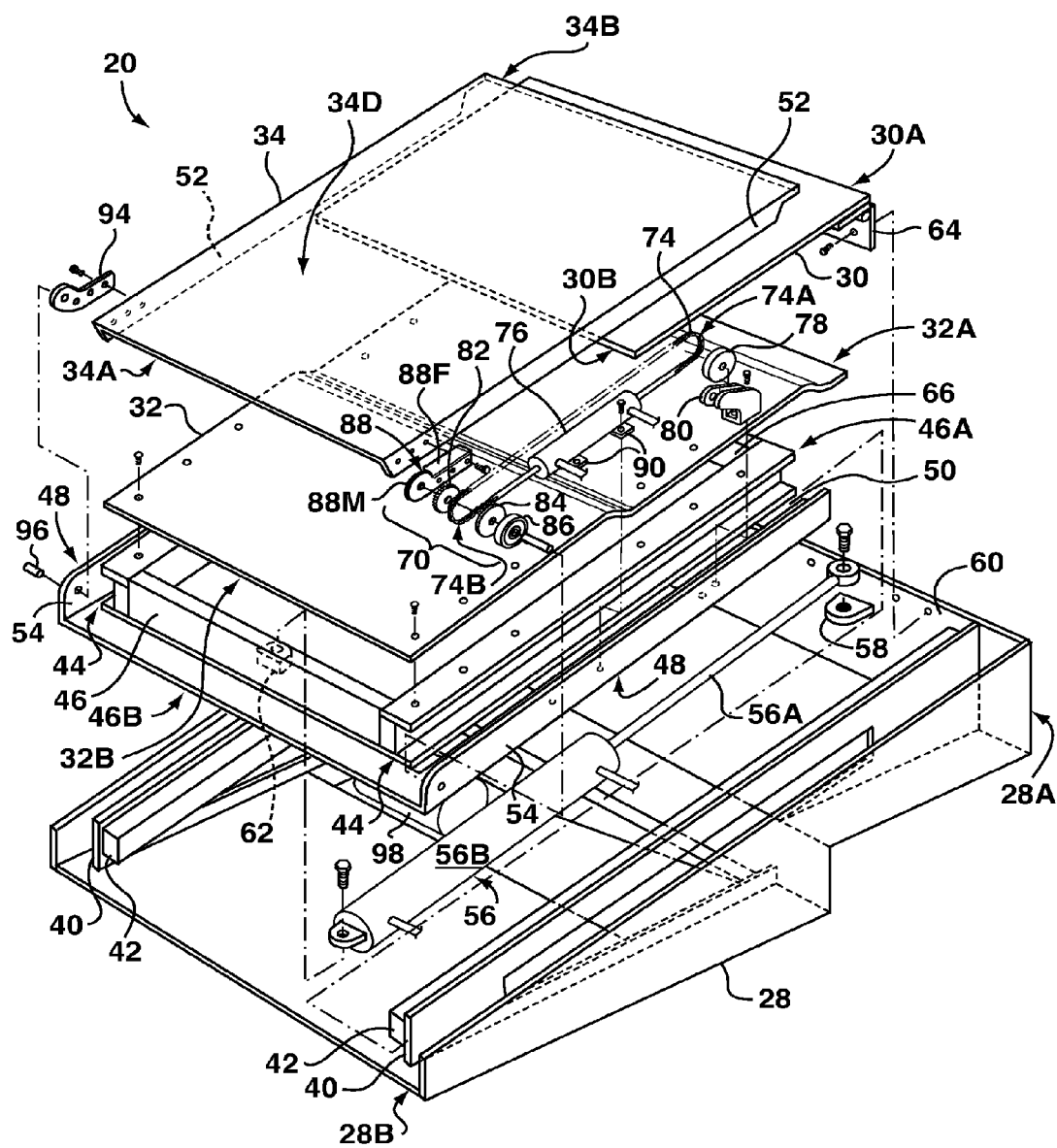
FIG. 12 is an exploded perspective view of the ramp system of FIG. 1.

Turning now to FIG. 12, construction of the exemplary ramp system 20 will now be described. The main frame 28 carries two opposed, spaced apart guide supports 40 to which are secured two inwardly facing guides 42. When the main frame 28 is in an upright position, the guide supports 40, and hence the guides 42, descend from the inboard end 28A to the outboard end 28B of the main frame 28 and define the inclined path of constant slope along which the outboard ramp section 32 and the outboard extension ramp section 34 travel. The guides 42 are slidably received in opposed outwardly facing guide channels 44 defined by a movable frame 46 which carries both the outboard ramp section 32 and the outboard extension ramp section 34. Thus, the outboard ramp section 32 and the outboard extension ramp section 34 are carried by the main frame 28 by way of the main frame 28 carrying the movable frame 46 which carries both the outboard ramp section 32 and the outboard extension ramp section 34. The guide channels 44 extend along the length of the movable frame 46, and a pair of elongate L-shaped brackets 48, which form part of the movable frame 46, extend along the sides of the movable frame 46, spaced from and parallel to the guide channels 44. Elongate slots 50 (only one of which is visible in FIG. 12), which are open at the inboard end 46A and closed at the outboard end 46B of the movable frame 46, are defined between the guide channels 44 and the L-shaped brackets 48 to receive the guide supports 40 so that the movable frame 46 can be slidably mounted on the main frame 28 by placing the inboard end 46A of the movable frame 46 at the outboard end 28B of the main frame 28, aligning the guides 42 with the guide channels 44 and sliding the inboard end 46A of the movable frame 46 toward the inboard end 28A of the main frame 28.

The outboard ramp section 32 is fixed to the movable frame 46 while the pivot end 34A of the outboard extension ramp section 34 is pivotingly secured to the movable frame 46 at the outboard end 46B thereof. Specifically, the outboard extension ramp section 34 includes sidewalls 52 which project from the first outboard extension travel surface 34C, substantially orthogonally thereto, and these sidewalls 52 are pivotally secured to the upwardly projecting portions 54 of the L-shaped brackets 48 at the pivot end 34A of the outboard extension ramp section 34 and the outboard end 46B of the movable frame 46. Thus, the movable frame 46 can slide along the guides 42, enabling the outboard ramp section 32 and the outboard extension ramp section 34 (each carried by the movable frame 46) to slide together along the inclined path of constant slope. An actuator in the form of a double-acting, single-piston hydraulic piston-cylinder assembly 56 extends between the movable frame 46 and the main frame 28 to reciprocate the movable frame 46 along the guides 42 between an extended and a retracted position, thereby moving the outboard ramp section 32 between the outboardly extended position and the inboardly retracted position. In particular, the distal end of the piston 56A of the piston-cylinder assembly 56 extends through an aperture (not shown) in the inboard end wall 66 of the movable frame 46 and is secured to a bracket 58 on the inboard end wall 60 of the main frame 28 and the distal end of the cylinder 56B of the piston-cylinder assembly 56 is secured to a bracket 62 disposed on the movable frame 46 at the outboard end 46B thereof. The inboard ramp section 30 is hingedly mounted at its inboard end 30A to the inboard end wall 60 of the main frame 28 by a hinge 64.

Figure 13A:
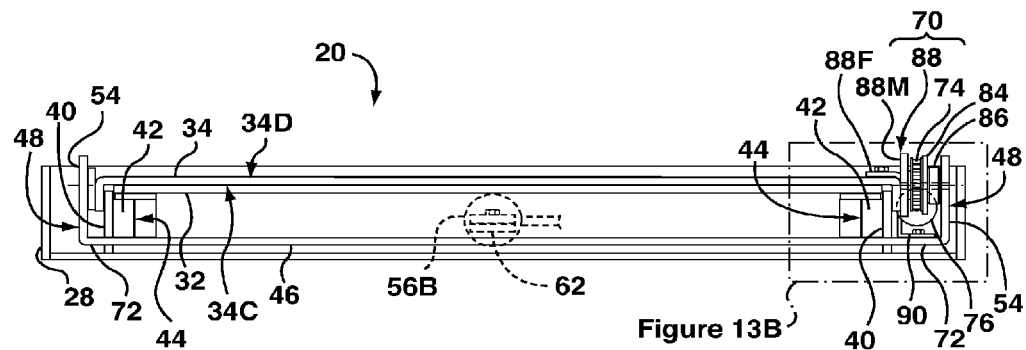
FIG. 13A is an end view of the ramp system of FIG. 1.
Figure 13B:
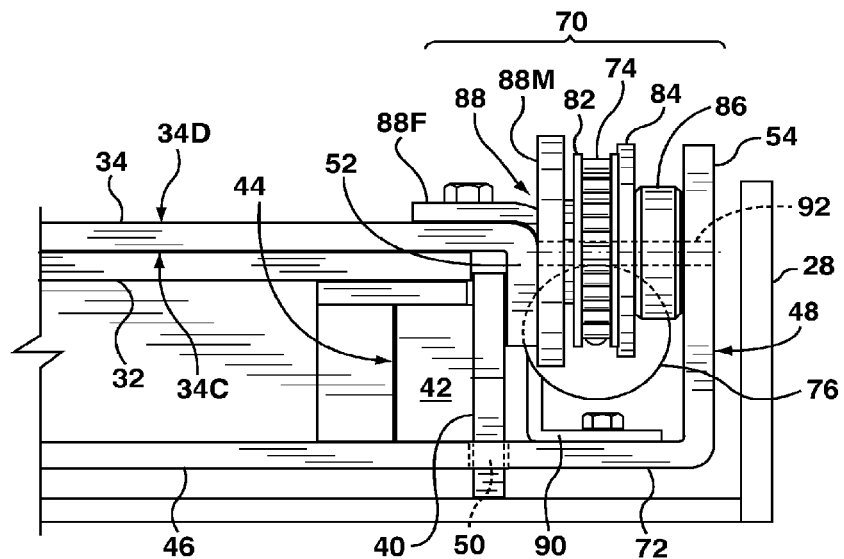
FIG. 13B is a detailed end view of a portion of the ramp system of FIG. 1, showing the pivot actuator mechanism thereof.

With reference now to FIGS. 13A and 13B as well as FIG. 12, details of the arrangement for pivoting the outboard extension ramp section 34 between the deployed position (in which the outboard extension ramp section 34 extends generally outboardly from adjacent the outboard end 32B of the outboard ramp section 32) and the stowed position (in which the outboard extension ramp section 34 extends generally inboardly from adjacent the outboard end 32B of the outboard ramp section 32) will now be described. A pivot actuator mechanism 70 is mounted on the movable frame 46, in particular on one of the inwardly projecting portions 72 of the L-shaped brackets 48. The pivot actuator 70 comprises a chain loop 74 in which is interposed a double-acting, double-piston hydraulic piston-cylinder assembly 76, and further comprises a support wheel 78 and wheel bracket 80, a sprocket 82, a bushing 84, a bearing 86, a drive arm 88 having a downwardly projecting main portion 88M and an inwardly projecting flange 88F, and a pivot pin 92 (FIG. 13B). The double-piston hydraulic piston-cylinder assembly 76 is secured to the inwardly projecting portion 72 of the L-shaped bracket 48 by piston brackets 90, with the distal end of each piston secured to an end of the chain forming the chain loop 74. The wheel bracket 80 is also mounted on the inwardly projecting portion 72 of the L-shaped bracket 48, and rotatably carries the support wheel 78, which supports the inboard end 74A of the chain loop 74. The outboard end 74B of the chain loop is supported by and engages the teeth of the sprocket 82, which is welded or otherwise secured to the main portion 88M of the drive arm 88 to move in unison therewith. The sprocket 82 is sandwiched between the main portion 88M of the drive arm 88 to which it is secured, on the inward side, and the bushing 84 on the outward side, with the bearing 86 in turn sandwiched between the bushing 84 and the upwardly projecting portion 54 of the L-shaped bracket 48, with the pivot pin 92 extending through apertures in each of the bearing 86, the bushing 84, the sprocket 82 and the main portion 88M of the drive arm 88. The main portion 88M of the drive arm 88 is secured to the sidewall 52 of the outboard extension ramp section 34 at the pivot end 34A thereof, and the inwardly projecting flange 88F of the drive arm 88 is secured to the second outboard extension travel surface 34D of the outboard extension ramp section 34.

Linear movement of the double-piston hydraulic piston-cylinder assembly 76 causes movement of the chain loop 74, which rotates the sprocket 82. Since the sprocket 82 is secured to the drive arm 88, which in turn is secured to the outboard extension ramp section 34, rotation of the sprocket 82 will pivot the drive arm 88 about the pivot pin 92, enabling the outboard extension ramp section 34 to pivot between the deployed position and the stowed position. It is to be noted that the pivot actuator 70 is a linear reciprocating chain drive that enables a linear actuator, namely the double-piston hydraulic piston-cylinder assembly 76, to generate reciprocal rotational movement of the sprocket 82. As shown in FIG. 12, the side of the outboard extension ramp section 34 opposite the side to which the drive arm 88 is mounted is pivotally supported relative to the movable frame 46 by a support arm 94 secured to the sidewall 52 of the outboard extension ramp section 34 at the pivot end 34A thereof, with the support arm 94 pivotally mounted to the upwardly projecting portion 54 of the L-shaped bracket 48 by a pivot pin 96.

The single-piston hydraulic piston-cylinder assembly 56 and the double-piston hydraulic piston-cylinder assembly 76 receive hydraulic fluid from a pump 98 (shown in FIG. 12), with distribution of the hydraulic fluid, and hence operation of the single-piston hydraulic piston-cylinder assembly 56 and the double-piston hydraulic piston-cylinder assembly 76, governed by a control system (not shown) under the command of an operator. For example, the control system may enable the operator to simply select from the fully retracted configuration, the first partially extended or "step in" configuration, the second partially extended or "curb ramp" configuration and the fully extended configuration, and automatically move the ramp system 20 into the selected configuration. Alternatively, the control system may enable the operator to precisely control the movement of the single-piston hydraulic piston-cylinder assembly 56 and the double-piston hydraulic piston-cylinder assembly 76 so as to enable the operator to place the ramp into an indeterminate number of configurations, depending on the circumstances. Preferably, the hydraulic system of the ramp system 20 includes valves which are responsive to pressure so that if the outboard extension ramp section 34 or movable frame 46 encounters an unexpected obstacle, the relevant valve will divert hydraulic fluid so as to arrest further movement and prevent damage.

While the exemplary ramp system 20 described herein uses hydraulic actuators, one skilled in the art, now informed by the herein disclosure, will appreciate that pneumatic actuators or electrical actuators may be used, and that rotational actuators rather than linear actuators can be used with suitable modification.

In the illustrated embodiment, the inboard ramp section 30, outboard ramp section 32 and outboard extension ramp section 34 define respective planar travel surfaces 30C, 32C, 34C, 34D. In other embodiments, one or more of the ramp sections, and hence its corresponding travel surface, may have a slight camber; this is within the contemplation of the present disclosure and in such cases the ramp section and associated travel surface(s) are still considered to be generally planar.

In certain alternative embodiments, the outboard extension ramp section may be slidably carried by the main frame rather than pivotally carried; in such an embodiment the outboard extension ramp section would slidably reciprocated between a deployed position in which the outboard extension ramp section extended generally outboardly from adjacent the outboard end of the outboard ramp section to a first inclined travel path sloping generally upwardly toward the outboard end of the outboard ramp section and a stowed position in which the outboard extension ramp section extended generally inboardly from adjacent the outboard end of the outboard ramp section.

Figure 6:
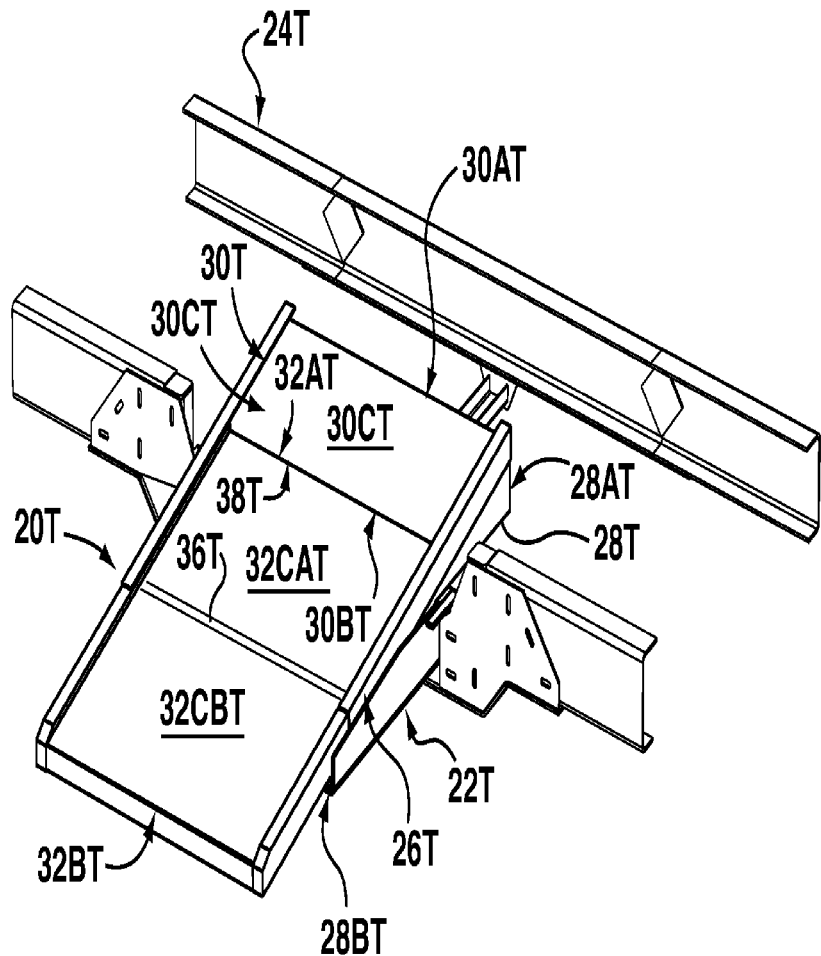
FIG. 6 is a perspective view showing a second exemplary ramp system in an extended or "step in" configuration.
Figure 11:
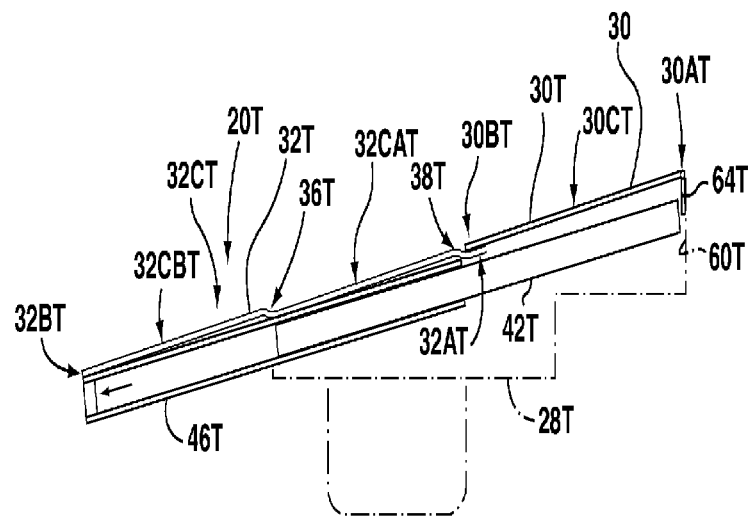
FIG. 11 is side schematic view showing the ramp system of FIG. 6 in the extended or "step in" configuration.

It is also to be appreciated that in other embodiments, a ramp system may be provided which does not include any outboard extension ramp section; such a ramp system would reciprocate between a fully retracted position and a fully extended, "step in" configuration. An exemplary embodiment of such a ramp system is shown, in the fully extended, "step in" configuration, in FIGS. 6 and 11. The ramp system shown in FIGS. 6 and 11 is denoted by reference 20T and is substantially identical to the ramp system 20 described above, except that the outboard extension ramp section and other components associated therewith have been omitted. Corresponding reference numerals are used to refer to corresponding features, except with the suffix "T".

In the illustrated embodiments, the outboard ramp section and the inboard ramp section are carried by the main frame so that when the main frame is fixedly mounted to a vehicle, the inboard travel surface and the outboard travel surface are at a fixed incline and generally descend from their respective inboard ends to their respective outboard ends, relative to the travel plane of the vehicle, generally defined by the surface over which the vehicle travels. Similarly, the outboard extension ramp section is carried by the main frame so that when the main frame is fixedly mounted to a vehicle, the ramp extension travel surface provided by the outboard extension ramp section is also inclined and generally descends from the inboard end to the outboard end in both the deployed and stowed position. In other embodiments, the main frame may be pivotally mounted to the vehicle at or adjacent its inboard end so that the main frame can pivot between a level position and an inclined position by raising or lowering the outboard end of the main frame, relative to the inboard end of the main frame. When the outboard end of the main frame is in the level position, the inboard travel surface, the outboard travel surface and the ramp extension travel surface provided by any outboard extension ramp section may all be substantially parallel to the travel plane of the vehicle, and the uppermost travel surface can form part of the vehicle floor. Lowering the outboard end of the main frame would then bring the inboard travel surface, the outboard travel surface and the ramp extension travel surface provided by any outboard extension ramp section into an inclined position, descending from the inboard end to the outboard end, relative to the travel plane of the vehicle, so that an inclined travel path into and out of the vehicle may be provided. Depending on the circumstances, with the main frame in either the level position or an inclined position, the ramp system carried by the main frame can be placed in any one of the fully retracted configuration, the first partially extended "step-in" configuration, the second partially extended "curb ramp" configuration, the fully extended configuration or an intermediate configuration. For example, where a curbed sidewalk is level with the floor of the vehicle, the main frame may be in the level position and the outboard ramp section may be extended, or the outboard extension ramp section moved to the deployed position, to provide a "bridge" over the road surface from the sidewalk to the vehicle floor. Where a user is boarding from a roadway, the main frame may be placed into a lowered position and the outboard ramp section may be extended, or the outboard extension ramp section moved to the deployed position, to provide an inclined ramp from the roadway to the vehicle. The main frame of such a ramp system may have a significantly smaller vertical height than the main frame of the illustrated ramp system and would therefore be better suited to low-floor buses.

The above description is intended in an illustrative rather than a restrictive sense. Variations to the exact embodiments described may be apparent to those skilled in the relevant art without departing from the spirit and scope of the claims set out below. It is intended that any such variations be deemed within the scope of this patent.

What is claimed is:

1. A ramp system, comprising:
   a main frame for mounting to a vehicle;
   the main frame having an inboard end and an outboard end relative to the inboard end;
   a ramp assembly carried by the main frame;
   the ramp assembly comprising:
   an inboard ramp section having an inboard end and an outboard end and having an inclined inboard travel surface which generally descends from the inboard end of the frame toward the outboard end of the frame; and
   an outboard ramp section having an inboard end and an outboard end and having an inclined outboard travel surface which generally descends from the inboard end of the outboard ramp section to the outboard end of the outboard ramp section;
   the inboard ramp section carried by the main frame with the inboard end of the inboard ramp section adjacent the inboard end of the main frame;
   the outboard ramp section slidably carried by the main frame to be slidably movable between an outboardly extended position and an inboardly retracted position, relative to the main frame;
   the outboard ramp section being slidably movable between the outboardly extended position and the inboardly retracted position along an inclined path of constant slope; and
   the inboard travel surface and the outboard travel surface cooperating to form a ramp surface for travel between the inboard end of the inboard ramp section and the outboard end of the outboard ramp section.

2. The ramp system of claim 1, wherein the ramp assembly further comprises:
   an outboard extension ramp section;
   the outboard extension ramp section having a pivot end and a free end and being pivotally carried at its pivot end by the main frame to move slidably with the outboard ramp
section and to pivot between:
a deployed position in which the outboard extension ramp section:
extends generally outboardly from adjacent the outboard end of the outboard ramp section; and
defines a first inclined travel path sloping generally upwardly from the free end to the pivot end; and
a stowed position in which the outboard extension ramp section:
extends generally inboardly from adjacent the outboard end of the outboard ramp section;
overlaps the outboard ramp section; and
defines a second inclined travel path sloping generally upwardly from the pivot end to the free end;
wherein when the outboard extension ramp section is in the deployed position, the first inclined travel path cooperates with the inboard travel surface and the outboard travel surface for travel between the inboard end of the inboard ramp section and the free end of the outboard extension ramp section.

3. The ramp system of claim 2, wherein:
the outboard extension ramp section has first and second opposed outboard extension travel surfaces;
the deployed position exposes the first outboard extension travel surface as the first inclined travel path; and
the stowed position exposes the second outboard extension travel surface as the second inclined travel path.

4. The ramp system of claim 1, wherein the outboard ramp section may be maintained in a plurality of intermediate positions between the outboardly extended position and the retracted position.

5. The ramp system of claim 1, wherein the inboard ramp section is longitudinally fixed relative to the main frame.

6. A ramp system, comprising:
a main frame for mounting to a vehicle;
the main frame having an inboard end and an outboard end relative to the inboard end;
a ramp assembly carried by the main frame;
the ramp assembly comprising:
an inboard ramp section having an inboard end and an outboard end and having an inboard travel surface;
an outboard ramp section having an inboard end and an outboard end and having an outboard travel surface; and
an outboard extension ramp section;
the inboard ramp section carried by the main frame with the inboard end of the inboard ramp section adjacent the inboard end of the main frame;
the outboard ramp section slidably carried by the main frame to be slidably movable between an outboardly extended position and an inboardly retracted position, relative to the main frame;
the inboard travel surface and the outboard travel surface cooperating to form a ramp surface for travel between the inboard end of the inboard ramp section and the outboard end of the outboard ramp section;
the outboard extension ramp section movably carried by the main frame to move slidably with the outboard ramp section and to move between:
a deployed position in which the outboard extension ramp section extends generally outboardly from adjacent the outboard end of the outboard ramp section to present a ramp extension travel surface for travel between the outboard end of the outboard ramp section and an outermost end of the outboard extension ramp section; and
a stowed position in which the outboard extension ramp section extends generally inboardly from adjacent the outboard end of the outboard ramp section in overlapping relation with the outboard ramp section.

7. The ramp system of claim 6, wherein:
the inboard travel surface is inclined and generally descends from the inboard end of the frame toward the outboard end of the frame; and
the outboard travel surface is inclined and generally descends from the inboard end of the outboard ramp section to the outboard end of the outboard ramp section.

8. The ramp system of claim 7, wherein the outboard extension ramp section is pivotally carried by the main frame to pivot between the deployed position and the stowed position.

9. The ramp system of claim 8, wherein:
the outboard extension ramp section has first and second opposed outboard extension travel surfaces;
the deployed position exposes the first outboard extension travel surface as the ramp extension travel surface; and
the stowed position exposes the second outboard extension travel surface for travel from the outboard end of the outboard extension ramp section to the inboard end of the outboard extension ramp section.

10. The ramp system of claim 7, wherein the inboard ramp section is longitudinally fixed relative to the main frame.

11. The ramp system of claim 7, wherein the outboard ramp section may be maintained in a plurality of intermediate positions between the outboardly extended position and the retracted position.

* * * * *

UNITED STATES PATENT AND TRADEMARK OFFICE
CERTIFICATE OF CORRECTION

| | | |
|---|---|---|
| PATENT NO. | : 8,800,087 B2 | Page 1 of 1 |
| APPLICATION NO. | : 14/025785 | |
| DATED | : August 12, 2014 | |
| INVENTOR(S) | : Wally Couto and John Goddard | |

It is certified that error appears in the above-identified patent and that said Letters Patent is hereby corrected as shown below:

On the title page item (63), entitled "Related U.S. Application Data," please replace "Mar. 12, 2012" with "Mar. 13, 2012."

Signed and Sealed this
Tenth Day of February, 2015

Michelle K. Lee
*Deputy Director of the United States Patent and Trademark Office*